United States Patent
Kim et al.

(10) Patent No.: US 10,715,290 B2
(45) Date of Patent: Jul. 14, 2020

(54) APPARATUS AND METHOD FOR BEAM MANAGEMENT BASED ON CHANNEL STATE INDICATOR-REFERENCE SIGNAL

(71) Applicant: KT CORPORATION, Gyeonggi-do (KR)

(72) Inventors: Ki-tae Kim, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 78 days.

(21) Appl. No.: 16/027,937

(22) Filed: Jul. 5, 2018

(65) Prior Publication Data

US 2019/0020454 A1    Jan. 17, 2019

(30) Foreign Application Priority Data

Jul. 14, 2017    (KR) .................. 10-2017-0089654
May 11, 2018    (KR) .................. 10-2018-0054207

(51) Int. Cl.
| | |
|---|---|
| *H04L 5/00* | (2006.01) |
| *H04B 7/06* | (2006.01) |
| *H04L 12/24* | (2006.01) |
| *H04W 88/02* | (2009.01) |

(52) U.S. Cl.
CPC ......... *H04L 5/0048* (2013.01); *H04B 7/0617* (2013.01); *H04B 7/0626* (2013.01); *H04L 5/0023* (2013.01); *H04L 5/0091* (2013.01); *H04L 41/0803* (2013.01); *H04L 5/001* (2013.01); *H04W 88/02* (2013.01)

(58) Field of Classification Search
CPC ... H04L 41/0803; H04L 5/001; H04L 5/0023; H04L 5/0048; H04L 5/0091; H04B 7/0617; H04B 7/0626; H04W 72/044
See application file for complete search history.

(56) References Cited

U.S. PATENT DOCUMENTS

| | | | |
|---|---|---|---|
| 2016/0065339 A1* | 3/2016 | Matsumoto | H04L 5/0048 370/329 |
| 2018/0102817 A1* | 4/2018 | Park | H04B 7/04 |
| 2018/0227793 A1* | 8/2018 | Kim | H04L 5/001 |
| 2018/0269947 A1* | 9/2018 | Levitsky | H04B 7/088 |
| 2019/0007117 A1* | 1/2019 | Kim | H04W 72/046 |
| 2019/0181922 A1* | 6/2019 | Lee | H04B 7/0695 |
| 2019/0312668 A1* | 10/2019 | Park | H04L 5/00 |

OTHER PUBLICATIONS

NPL document, "LG electronics: Remaining details on intra-cell CSI-RS in Rel-10" 3GPP Draft; R1-106321 Jacksonville, USA. Nov. 15-19, 2010 (Year: 2010).*
Xinwei, "Further Discussion on CSI Settings and Beam Management", R1-1700779, 3GPP TSG-RAN WG1 NR Ad Hoc, Spokane, Washington, Jan. 16-20, 2017.

* cited by examiner

*Primary Examiner* — Mewale A Ambaye
(74) *Attorney, Agent, or Firm* — IP Legal Services, LLC

(57) ABSTRACT

Provided is an apparatus and method for beam management based on a channel state indicator (CSI)-reference signal (RS). A method for a user equipment (UE) to receive a CSI-RS from a base station (BS) includes receiving configuration information of a CSI-RS resource set including one or more CSI-RS resources, and receiving a CSI-RS from a BS through CSI-RS resources included in the CSI-RS resource set. The configuration information of the CSI-RS resource set includes indication information indicating beam configurations for the respective CSI-RS resources included in the CSI-RS resource set.

12 Claims, 13 Drawing Sheets

APPARATUS AND METHOD FOR BEAM MANAGEMENT BASED ON CHANNEL STATE INDICATOR-REFERENCE SIGNAL

CROSS REFERENCE TO RELATED APPLICATION

This application claims priority from Korean Patent Application Nos. 10-2017-0089654 & 10-2018-0054207, filed on Jul. 14, 2017 & May 11, 2018, which are hereby incorporated by reference for all purposes as if fully set forth herein.

BACKGROUND OF THE INVENTION

1. Field of the Invention

The present disclosure relates to an apparatus and method for beam management based on a channel state indicator (CSI)-reference signal (RS), and more particularly, to an apparatus and method for setting a CSI-RS for beam management in a next generation/fifth generation (5G) (will be referred to as New Radio (NR) below) radio access network.

2. Description of the Prior Art

Recently, the Third Generation Partnership Project (3GPP) approved "Study on New Radio Access Technology" which is a study item for research on next generation/5G radio access technology, and Radio Access Network (RAN) Working Group 1 (WG1) is separately discussing frame structures, channel coding and modulation, waveforms, multiple-access schemes, etc. for NR on the basis of the technology. It is required to design an NR not only to provide an improved data transmission rate compared to Long Term Evolution (LTE)/LTE-Advanced but also to satisfy various demands for subdivided and detailed usage scenarios.

As representative usage scenarios of NR, enhanced Mobile BroadBand (eMBB), massive Machine Type Communication (mMTC), and Ultra Reliable and Low Latency Communications (URLLC) are proposed, and it is required to design a frame structure to be flexible in comparison to LTE/LTE-Advanced in order to satisfy the demands of respective usage scenarios.

In particular, a discussion is currently underway on a CSI-RS related to beam management in NR multiple-input multiple-output (MIMO), but no determination has been made yet on a detailed method of configuring CSI-RS resources.

SUMMARY OF THE INVENTION

The present disclosure is to provide a method of setting up channel state indicator (CSI)-reference signal (RS) resources for transmitting multiple transmission (Tx) beams by using a CSI-RS configuration method which is defined by default in New Radio (NR) in relation to beam management.

Objects of the present disclosure are not limited thereto, and other objects which have not been mentioned will be apparent to those of ordinary skill in the art from the following descriptions.

In accordance with an embodiment, a method may be provided for a user equipment (UE) to receive a CSI-RS from a base station (BS). The method may include: receiving configuration information of a CSI-RS resource set including one or more CSI-RS resources; and receiving a CSI-RS from a BS through CSI-RS resources included in the CSI-RS resource set. The configuration information of the CSI-RS resource set includes indication information indicating beam configurations for the respective CSI-RS resources included in the CSI-RS resource set.

In accordance with another embodiment, a method may be provided for a BS to transmit a CSI-RS to a UE. The method may include: transmitting configuration information of a CSI-RS resource set to a UE; and transmitting a CSI-RS to the UE by using CSI-RS resources included in the CSI-RS resource set. The configuration information of the CSI-RS resource set includes indication information indicating beam configurations for the respective CSI-RS resources included in the CSI-RS resource set.

In accordance with further another embodiment, a UE may be provided for receiving a CSI-RS from a BS. The UE may include a receiver configured to receive configuration information of a CSI-RS resource set include one or more CSI-RS resources and receive a CSI-RS from a BS through CSI-RS resources included in the CSI-RS resource set. The configuration information of the CSI-RS resource set includes indication information indicating beam configurations for the respective CSI-RS resources included in the CSI-RS resource set.

In accordance with still another embodiment, a BS may be provided for transmitting a CSI-RS to a UE. The BS may include: a controller configured to configure a CSI-RS resource set with one or more CSI-RS resources; and a transmitter configured to transmit configuration information of the CSI-RS resource set to a UE and transmit a CSI-RS to the UE by using CSI-RS resources included in the CSI-RS resource set. The configuration information of the CSI-RS resource set includes indication information indicating beam configurations for the respective CSI-RS resources included in the CSI-RS resource set.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
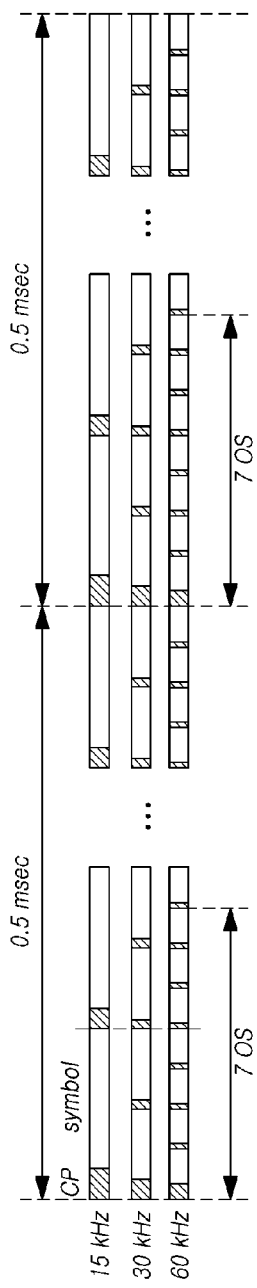
FIG. 1 shows an arrangement of orthogonal frequency-division multiplexing (OFDM) symbols according to an embodiment of the present disclosure when different sub-carrier spacing (SCS) values are used.

Hereinafter, embodiments of the present disclosure will be described in detail with reference to the accompanying drawings. In adding reference numerals to elements in each drawing, the same elements will be designated by the same reference numerals if possible, although they may be shown in different drawings. Further, in the following description of the present disclosure, a detailed description of known functions and configurations incorporated herein will be omitted when it is determined that the description may make the subject matter of the present disclosure rather unclear.

In this specification, a wireless communication system denotes a system for providing various communication services, such as voice, packet data, and the like. A wireless communication system includes a user equipment (UE) and a base station (BS).

The UE is a comprehensive concept that refers to a terminal in wireless communication and should be construed as encompassing not only the UE in a wideband code division multiple access (WCDMA) network, a Long Term Evolution (LTE) network, a high speed packet data access (HSPA) network, an International Mobile Telecommunication 2020 (IMT-2020; fifth generation (5G) or New Radio (NR)) network, etc., but also a mobile station (MS), a user terminal (UT), a subscriber station (SS), a wireless device, etc. in Global System for Mobile communication (GSM).

The BS or a cell refers to a station which generally communicates with the UE and includes a node-B, an evolved node-B (eNB), a gateway station Node-B (gNB), a low power node (LPN), a sector, a site, various types of antennas, a base transceiver system (BTS), an access point, a point (e.g., a transmission (Tx) point, a reception (Rx) point, and a Tx/Rx point)), and various coverage regions, such as a mega-cell, a macro-cell, a micro-cell, a picocell, a femtocell, a remote radio head (RRH), a radio unit (RU), a small cell, and the like.

Since there is a BS for controlling each of the various cells listed above, the BS may be interpreted into two meanings: 1) a device itself for providing the mega-cell, the macro-cell, the micro-cell, the picocell, the femtocell, or the small cell in relation to a radio region or 2) the radio region itself. According to the first meaning, BSs may be i) devices provide certain radio regions under control of the same entity or ii) devices interact with each other to cooperatively provide the radio region. For example, the BS may be A point, a Tx/Rx point, a Tx point, a Rx point, etc according to a method of providing the radio region. According to the second meaning, the BS may be the radio region itself in or from which a signal is received or transmitted from the viewpoint of the UE or a neighboring BS.

In this specification, the cell may refer to the coverage of a signal transmitted from the Tx/Rx point, a component carrier having the coverage of the signal transmitted from the Tx point or the Tx/Rx point, or the Tx/Rx point itself.

In this specification, the UE and the BS are used as comprehensive meanings of two transmitting and receiving entities (uplink or downlink) used to implement the technology or technical spirit described in the present disclosure and are not limited to terms or words that are specifically referred to.

Here, the uplink (UL) refers to data transmission and reception from the UE to the BS, and the downlink (DL) refers to data transmission and reception from the BS to the UE.

For UL Tx and DL Tx, it is possible to use i) time division duplex (TDD) in which Tx is performed by using different times, ii) frequency division duplex (FDD) in which Tx is performed by using different frequencies, or iii) a mixed scheme of TDD and FDD.

Also, in a wireless communication system, the UL and the DL are configured on the basis of one carrier wave or one pair of carrier waves according to a related standard.

In the UL and the DL, control information is transmitted through a control channel, such as a physical downlink control channel (PDCCH), a physical uplink control channel (PUCCH), etc., and the UL and the DL are configured as data channels, such as a physical downlink shared channel (PDSCH), a physical uplink shared channel (PUSCH), etc., such that data is transmitted.

The DL may refer to communication or a communication path from a multi-Tx/Rx point to the UE, and the UL may refer to communication or the communication path from the UE to the multi-Tx/Rx point. In the DL, a transmitter may be a part of the multi-Tx/Rx point, and a receiver may be a part of the UE. In the UL, a transmitter may be a part of the UE, and a receiver may be a part of the multi-Tx/Rx point.

A situation in which a signal is transmitted and received through the channel, such as the PUCCH, the PUSCH, the PDCCH, or the PDSCH, may also be referred to below as "the PUCCH, the PUSCH, the PDCCH, or the PDSCH is transmitted and received."

Meanwhile, high layer signaling mentioned below includes radio resource control (RRC) signaling for transmitting RRC information including an RRC parameter.

The BS performs DL Tx to UEs. The BS may transmit the PDCCH for transmitting DL control information, such as scheduling required to receive a DL data channel, which is a main physical channel for unicast transmission, and scheduling grant information for Tx in a UL data channel. Tx and Rx of a signal through each channel will be referred to below as "Tx and Rx of a channel."

Any multiple access scheme may be applied to a wireless communication system. Various multiple access schemes include time-division multiple access (TDMA), frequency-division multiple access (FDMA), CDMA, orthogonal frequency-division multiple access (OFDMA), non-orthogonal multiple access (NOMA), OFDM-TDMA, OFDM-FDMA, and OFDM-CDMA. Here, NOMA includes sparse code multiple access (SCMA), low density spreading (LDS), and the like.

An embodiment of the present disclosure may be applied to resource allocation in asynchronous wireless communication, which evolves into LTE/LTE-Advanced (LTE-A) and IMT-2020 through GSM, WCDMA, and HSPA, synchronous wireless communication which evolves into CDMA, CDMA2000, and Ultra Mobile Broadband (UMB), and the like.

In this specification, a machine-type communication (MTC) UE may refer to i) a UE which supports low cost (or low complexity), ii) a UE which supports coverage enhancement, or the like. Alternatively, in this specification, an MTC UE may refer to a UE defined as a specific category to support low cost (or low complexity) and/or coverage enhancement.

In other words, in this specification, the MTC UE may refer to a Third Generation Partnership Project (3GPP) Release-13 low cost (or low complexity) UE category/type which is newly defined and performs LTE-based MTC-related operation. Alternatively, in this specification, the MTC UE may support enhanced coverage compared to the existing LTE coverage or may refer to a UE category/type defined in 3GPP Release-12 or less which supports low power consumption or a Release-13 low cost (or low complexity) UE category/type which is newly defined. Otherwise, the MTC UE may refer to a further enhanced MTC UE defined in Release-14.

In this specification, a narrowband Internet of things (NB-IoT) UE refers to a UE supporting radio access for cellular IoT. Objects of the NB-IoT technology includes improved indoor coverage, support for large-scale low-speed UEs, low latency sensitivity, inexpensive cost of UEs, low power consumption, and optimized network architecture.

Representative usage scenarios in NR are recently under discussion in the 3GPP and may include enhanced Mobile BroadBand (eMBB), massive Machine Type Communication (mMTC), and Ultra Reliable and Low Latency Communications (URLLC).

In this specification, frequencies, frames, subframes, resources, resource blocks, regions, bands, sub-bands, control channels, data channels, synchronization signals, various reference signals, various signals, and various messages related to NR may be interpreted as meanings used in the past or present or various meanings which will be used in the future.

[5G NR]

Representative usage scenarios in NR are recently under discussion in the 3GPP and include eMBB, mMTC, and URLLC In this specification, frequencies, frames, subframes, resources, resource blocks, regions, bands, sub-bands, control channels, data channels, synchronization signals, various reference signals, various signals, and various messages related to NR may be interpreted as meanings used in the past or present or various meanings which will be used in the future.

Recently, the 3GPP approved "Study on New Radio Access Technology" which is a study item for research on next generation/5G radio access technology, and separate discussions have begun on frame structures, channel coding and modulation, waveforms, multiple-access schemes, etc. for NR on the basis of the technology.

It is required to design an NR not only to improve data transmission rate compared to LTE/LTE-A but also to satisfy various demands for subdivided and detailed usage scenarios. In particular, eMBB, mMTC, and URLLC have been proposed as representative usage scenarios of NR, and it is necessary to design a frame structure to be flexible in comparison to LTE/LTE-Advanced for satisfying requirements of respective usage scenarios.

The usage scenarios have different requirements of data rates, latency, coverage, etc. Accordingly, it is necessary to develop a method of efficiently multiplexing radio resource units on the basis of different numerologies (e.g., subcarrier spacing (SCS) values, subframes, transmission time intervals (TTIs), etc.) in order to efficiently satisfy usage scenario-specific requirements through a frequency band constituting an arbitrary NR system.

In order to develop such a method, discussions have been made on a method of supporting numerologies having different SCS values by multiplexing the numerologies on the basis of TDM, FDM, or TDM/FDM through one NR carrier and a method of supporting one or more time units when a scheduling unit is set in the time domain. In relation to this, a subframe was defined as a time domain structure in NR, and it was determined to define a single subframe duration composed of 14 OFDM symbols of a 15 kHz SCS-based normal cyclic prefix (CP) overhead, which is the same as that of LTE, as a reference numerology for defining a corresponding subframe duration. Accordingly, a subframe has a time duration of 1 ms in NR.

However, unlike LTE, a subframe in NR is an absolute reference time duration, and a slot and a mini-slot may be defined as a time unit which is a base of actual UL/DL data scheduling. In this case, Y, which is the number of OFDM symbols constituting a corresponding slot, was determined to have a value of 14 regardless of numerology.

Accordingly, any slot may be composed of 14 symbols. According to a Tx direction of the corresponding slot, all the symbols may be used for DL Tx or UL Tx, or used in the form of "DL portion+gap+UL portion."

Also, a mini-slot composed of a smaller number of symbols than the corresponding slot may be defined in an arbitrary numerology (or SCS), and on the basis of the mini-slot, a short time-domain scheduling interval for UL/DL data Tx and Rx may be set, or a long time-domain scheduling interval for UL/DL data Tx and Rx may be set through slot aggregation.

In particular, in the case of Tx and Rx of latency-critical data such as URLLC, when scheduling is made in units of 0.5 ms (7 symbols) or 1 ms (14 symbols) slots defined in a frame structure based on a numerology having a small SCS value such as 15 kHz, it may be difficult to meet latency requirements. To solve this problem, a mini-slot composed of a smaller number of OFDM symbols than the corresponding slot may be defined so that latency-critical data, such as the URLLC, may be scheduled on the basis of the mini-slot.

Alternatively, there have been discussions on a method of scheduling data according to latency requirements on the basis of slot (or mini-slot) lengths defined by numerology by supporting numerologies having different SCS values in one NR carrier through multiplexing based on TDM or FDM. For example, as shown in FIG. 1, a symbol length corresponding to an SCS value of 60 kHz is about ¼ of a symbol length corresponding to an SCS value of 15 kHz. Therefore, when one slot is composed of seven OFDM symbols, the 15 kHz-based slot length is 0.5 ms, and the 60 kHz-based slot length is reduced to about 0.125 ms.

As described, there have been many discussions made for defining different SCS or TTI lengths in NR in order to satisfy requirements of URLLC and eMBB.

[NR DMRS]

A CSI refers to a channel state indicator for replacing existing cell-specific reference signal (CRS)-based channel estimation and provides a channel state of a network. The CSI is cell-specific but configured by a radio resource control (RRC) signal of UE. A CSI-reference signal (RS) was introduced in LTE Release 10. The CSI-RS is used for UE to obtain channel state information by estimating a demodulation RS (DMRS).

Figure 2:
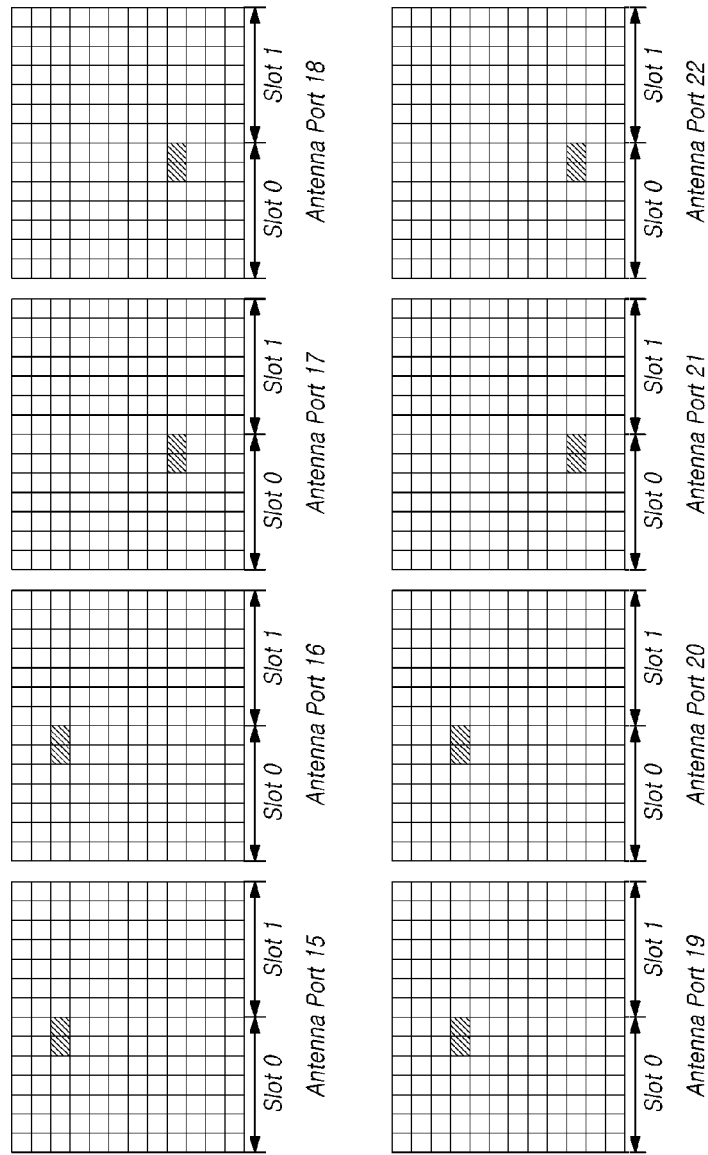
FIG. 2 shows channel state indicator (CSI)-reference signal (RS) structures of Long Term Evolution Advanced (LTE-A)

In LTE Release-8/9, a cell supports a maximum of four CRSs. However, with evolution into LTE-A (Release-10), it was necessary to extend a CSI for a cell RS which supports Tx of a maximum of eight layers. Here, antenna ports (APs) 15 to 22 are allocated as shown in FIG. 2, and Tx periods and mapping are determined through RRC configuration as resource allocation. Table 1 defines a mapping method through CSI-RS configuration in a normal CP.

TABLE 1

Mapping from CSI reference signal configuration to (k', l') for normal cyclic prefix

| CSI reference signal configuration | | 1 or 2 | | 4 | | 8 | |
|---|---|---|---|---|---|---|---|
| | | (k', l') | $n_s$mod2 | (k', l') | $n_s$mod2 | (k', l') | $n_s$mod2 |
| Fram | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

In NR multiple-input multiple-output (MIMO), some CSI-RS agreements have been made in relation to beam management, and the following agreements have been made on a CSI-RS of NR.

Agreements:
Regarding CSI-RS resource element (RE) patterns for CSI acquisition, support at least the following CSI-RS RE patterns for CSI acquisition for orthogonal cover code (OCC)-based code division multiplexing (CDM).

| X | Density [RE/RB/port] | N | (Y, Z) | CDM | Remark |
|---|---|---|---|---|---|
| 1 | >1, 1 | 1 | N.A. | No CDM | |
| 2 | 1 | 1 | (2, 1) | FD-CDM2 | |
| 4 | 1 | 2 | (2, 2) | FD-CDM2, CDM4(FD2, TD2) | |
| 8 | 1 | 2 | (2, 2) | FD-CDM2, CDM4(FD2, TD2) | |
| 16 | 1 | 2 | (2, 2) | FD-CDM2, CDM4(FD2, TD2) | |
| 32 | 1, ½ | 4 | (2, 2) | FD-CDM2, CDM4(FD2, TD2) | FFS, CDM8 details |

Note: The RE pattern for an X-port CSi-RS resource spans N≥1 OFDM symbols in the same slot and is comprised of one or multiple component CSI-RS RE patterns, where a component CSI-RS RE pattern is defined within a single physical resource block (PRB) as Y adjacent REs in the frequency domain and Z adjacent REs in the time domain.

Note: Density ½ is based on a PRB-level comb with the same comb offset value for all ports.
Note: REs for CDM2 and CDM4(FD2, TD2) comprise adjacent REs)
Note: Radio Access Network 1 (RAN1) will continue discussing about adding more entries to the above table.

Agreements:
CSI-RS resource with 1-port and 2-port for one OFDM symbol can be used for beam management.
Value of D>=1 represents RE/RB/port within the OFDM symbol.
For the case of 1-port
No CDM
Subcarrier spacing within a PRB for D>1
Even spacing
Constant subcarrier spacing across PRB(s)
Constant subcarrier spacing within a bandwidth part (BWP)
The values of D are for future study (FFS)
For the case of 2-port
Reuse the same pattern as that of CSI acquisition at least for D=1 (if supported)
FFS: the potential number of CSI-RS OFDM symbols for beam management FFS: other values of X and D for beam management In the link selection (LS) to RAN4, add "RAN1 are discussing the respective possible limited set values of D for 1-port and 2-port CSI-RS resource, e.g., taking from {1, 2, 3, 4, 6}. RAN 4 may also provide input values for selection of the values of D for each of 1-port and 2-port CSI-RS resources"

In current NR MIMO, it is not possible to provide a sub-time unit for directly transmitting several beams in a single symbol. An embodiment of the present disclosure may provide a sub-time unit for indirectly transmitting several beams in a single symbol by using a CSI-RS configuration method which is defined by default in NR.

In current beam management of NR MIMO, it has been determined to support two modes in relation of CSI-RS.

1 port CSI-RS Tx
  CDM is not used
  CSI-RS REs corresponding to a density D per RB (D={1, 2, 3, 4, 6}) can be transmitted in one symbol
  All CSI-RS REs are positioned at regular intervals
2 port CSI-RS Tx
  A structure determined for CSI-acquisition is reused among CSI-RSs
  (Y,Z)=(2,1)
  FD-CDM is applied 1. Beam Management Using 1 Port CSI-RS In the corresponding mode, only one CSI-RS port is used to perform beam management. Here, beam management basically refers to an operation of aligning a Tx beam of a Tx Rx point (TRP; gNB) and an Rx beam of a UE. In other words, the more a pair of corresponding Tx and Rx beams coincide with each other, the higher the Tx and Rx accuracy. For performing the operation, it is necessary to set a CSI-RS for beam management.

Figure 3:
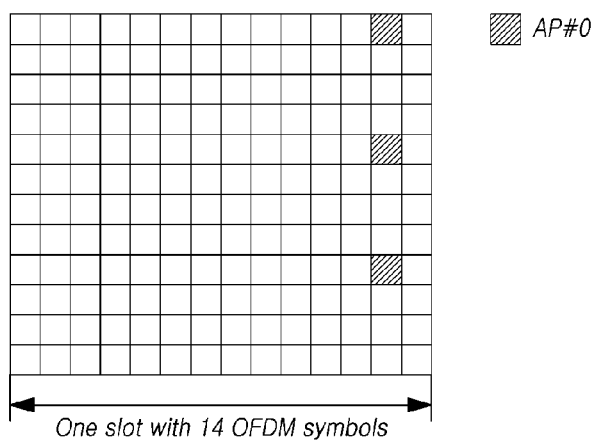
FIG. 3 shows an example of configuring a 1 port CSI-RS for beam management.

In current NR MIMO, it is possible to support beam management by using only one or two CSI-RS ports. For example, in the 1 port CSI-RS Tx mode, an arrangement is made as shown in FIG. 3. Here, D denotes a density per RE/PRB/port and is 3.

It is possible to see that a CSI-RS pattern for CSI acquisition of Table 2 below is reused in such an 1 port CSI-RS Tx mode. X denotes the total number of ports, N denotes the total number of symbols, and (Y,Z) denotes a basic RE pattern. Here, Y denotes the number of consecutive REs in the frequency axis, and Z denotes the number of consecutive symbols in the time axis.

TABLE 2

| X | Density [RE/RB/port] | N | (Y, Z) | CDM | Remark |
|---|---|---|---|---|---|
| 1 | >1, 1 | 1 | N.A. | No CDM | |

In the corresponding mode, only two CSI-RS ports are used to perform beam management. In current NR MIMO, it is possible to support beam management by using only one or two CSI-RS ports. Therefore, it is necessary to reuse an exiting 2 port CSI-RS pattern in the 2 port CSI-RS Tx mode, and a structure of Table 3 below is reused as it is.

Figure 4:
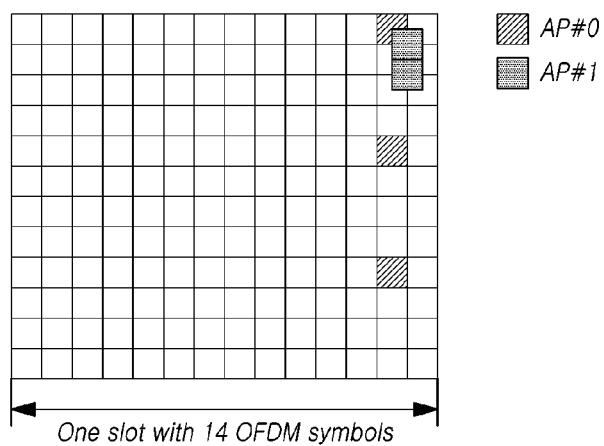
FIG. 4 shows an example of configuring a 2 port CSI-RS for beam management.

For example, in the 2 port CSI-RS Tx mode, an arrangement is made as shown in FIG. 4. In this arrangement, D denotes a density per CSI-RS port (RE/PRB/port) and is 1. Here, CSI-RS ports are code-division multiplexed on two consecutive REs on the frequency axis in the frequency domain. For example, CSI-RS AP #0 may be spread to CDM=[+1, +1], and CSI-RS AP #1 may be spread to CDM=[+1, −1], such that CSI-RS AP #0 and CSI-RS AP #1 may be multiplexed.

It is possible to see that a CSI-RS pattern for CSI acquisition of Table 3 below is reused in such a 2 port CSI-RS Tx mode.

TABLE 3

| X | Density [RE/RB/port] | N | (Y, Z) | CDM | Remark |
|---|---|---|---|---|---|
| 1 | >1, 1 | 1 | N.A. | No CDM | |
| 2 | 1 | 1 | (2, 1) | FD-CDM2 | |

In the above-described two CSI-RS structures, it is not possible to provide sub-time units by default for transmitting several beams in a single OFDM symbol.

Sub-time units are introduced into a single symbol to efficiently detect a pair of Tx and Rx beams in a beam management operation.

Figure 5:
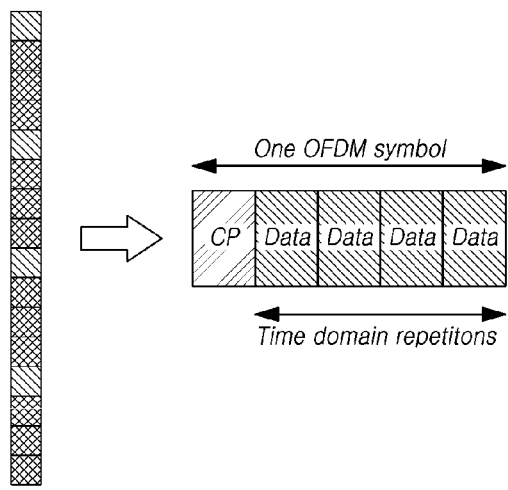
FIG. 5 is a diagram for describing a method of generating a sub-time unit in a single symbol by using interleaved frequency-division multiple access (IFDMA)

For example, FIG. 5 is a diagram for showing a method of repeatedly generating several signals in a single symbol by using a technique referred to as interleaved frequency-division multiple access (IFDMA). In FIG. 5, the same data (e.g., a signal for beam estimation) is repeated four times in a single symbol.

In beam management based on a single port CSI-RS, it is possible by default to repeatedly generate multiple beam sections in a single symbol by using IFDMA. However, a sub-time unit function is not provided in the current standardization step, and a method of indirectly generating sub-time units is necessary.

To generate a plurality of sub-time units by using IFDMA, data should not be multiplexed in a CSI-RS symbol region. Therefore, a CSI-RS port configuration and data multiplexing method for generating a sub-time unit by using IFDMA, large subcarrier spacing, or the like in single-port CSI-RS Tx will be described according to an embodiment of the present disclosure.

The principle of this method may also be used later to generate a beam of a sub-time unit by using multiple CSI-RS ports.

Various embodiments of a method in which a UE and a BS transmit and receive a CSI-RS through CSI-RS resources will be described in detail below.

Embodiments described below may be applied individually or collaboratively.

Embodiment 1. Assign Empty PDSCH to UE and Transmit CSI-RS in Corresponding Data Region so that Data is not Multiplexed in CSI-RS Symbol CSI-RS symbols are configured by a gNB to acquire CSI and transmitted to a UE. Such CSI-RS symbols are multiplexed with general data symbols by default. In other words, CSI-RS REs coexist with data REs in one symbol region. This is a basic mapping method for minimizing Tx loss by minimizing a density of a CSI-RS.

However, to generate a Tx beam in a form of repetition of the same signal in a single symbol, a CSI-RS symbol should be transmitted alone without being multiplexed with data.

Figure 6:
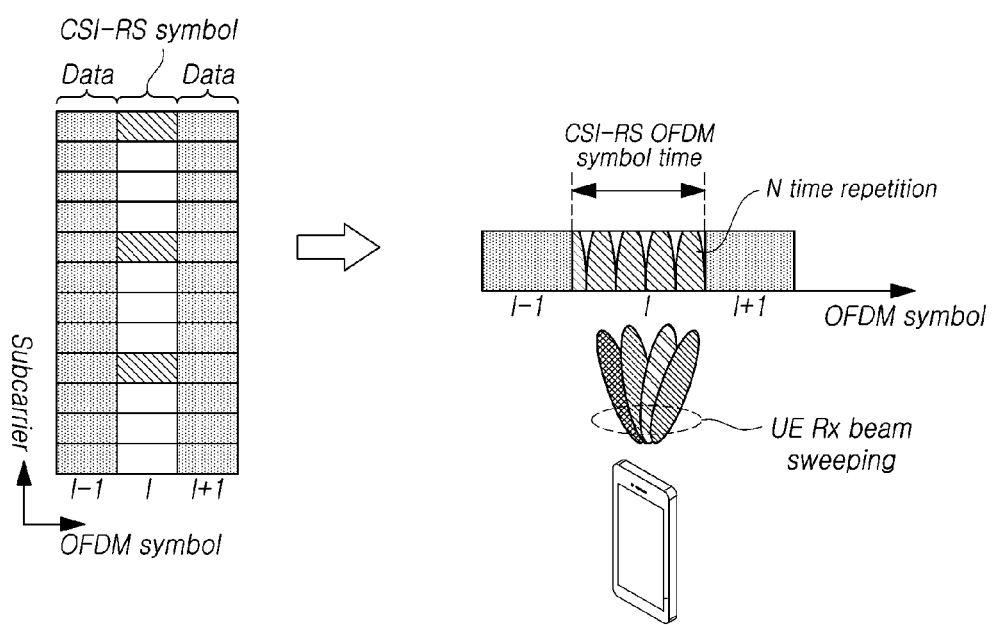
FIG. 6 is a diagram for showing a base station (BS) generating a section in which a signal is repeated multiple times in a single symbol and a user equipment (UE) detecting a received beam.

Only when CSI-RS REs and data REs are transmitted without being multiplexed in the same symbol, a signal is repeatedly generated in the time domain, as shown on the right side of FIG. 6, such that the UE may perform beam sweeping.

Therefore, according to an embodiment of the present disclosure, a method may be provided for assigning an empty PDSCH in relation to a method for separately transmitting the CSI-RS from existing data without multiplexing the CSI-RS with the existing data.

Figure 7:
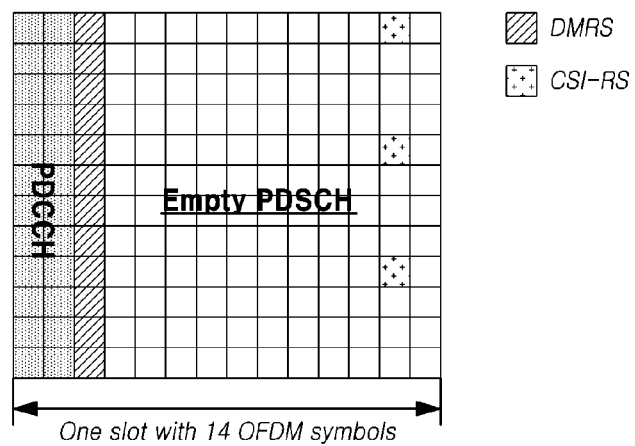
FIG. 7 is a diagram for showing assigning an empty physical downlink shared channel (PDSCH) to a UE and transmitting a CSI-RS in a corresponding region.

FIG. 7 is a diagram for showing assigning the empty PDSCH to UE and transmitting the CSI-RS in a corresponding region.

In NR MIMO, the CSI-RS is configured to be UE-specific by default and transmitted to the UE. Therefore a gNB may set a PDSCH allocation band and a CSI-RS Tx band of the UE to be identical. Here, the gNB sets the empty PDSCH and signals the corresponding information to the UE.

The UE receives the corresponding information, recognizes that the corresponding information is scheduling information of the empty PDSCH, and performs only a beam management operation by using the CSI-RS transmitted in the corresponding region without performing an actual data decoding operation.

A method for a gNB to set the empty PDSCH for a UE by default is given below. Like the related art, scheduling information of the empty PDSCH may be transferred to the UE on the basis of a downlink control indicator (DCI) of a DL grant through a PDCCH or may be transferred through RRC. Here, three methods of notifying the UE of whether a corresponding resource region is an empty PDSCH region may be defined as described below.

1. Define Additional Field in DCI Transferring PDCCH Scheduling Information

This scheduling method involves resource allocation information of subframes/slots whose UE-specific resource configuration regions, CSI-RS Tx periods, and Tx bandwidths at least overlap. Here, information on empties in a DCI field may be directly added with about 1 bit.

2. Set Tx Configuration Information of Empty PDSCH Through RRC

In this method, there is no direct dynamic signaling (no indication through a DCI in a DL grant), but an empty PDSCH region may be configured through RRC signaling. Even when PDSCH scheduling information is transferred to the UE, the UE assumes the region to be an empty PDSCH and performs beam management by using a CSI-RS.

3. Set Tx Configuration Information of Empty PDSCH Through RRC and Use Field in DCI as Actual Trigger In this method, a period, a position, etc. for empty PDSCH Tx are set through RRC, and the UE is notified whether an empty PDSCH is actually transmitted in the corresponding subframe/slot by a field in a DCI. Here, information indicating whether an empty PDSCH is transmitted in the DCI field may include a direct field or may indirectly use an existing reserved field or the like.

Embodiment 2. Allocate Empty Mini-Slot to UE and Transmit CSI-RS in Corresponding Region This embodiment 2 may have a procedure identical to an empty PDSCH of the embodiment 1. However, unlike the embodiment 1, the embodiment 2 uses a mini-slot.

Figure 8:
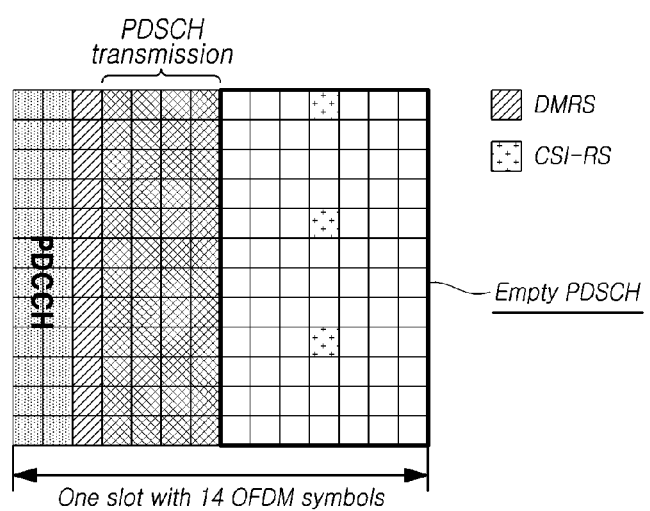
FIG. 8 is a diagram for showing assigning an empty mini-slot to a UE and transmitting a CSI-RS in a corresponding region.

FIG. 8 is a diagram showing assigning an empty mini-slot to a UE and transmitting a CSI-RS in a corresponding region.

In NR, a mini-slot may be defined in addition to a slot. Using such a mini-slot, NR provides a flexible resource scheduling method. This is mainly intended to support a service for promptly transmitting and receiving data, such as URLLC. Therefore, it is possible to configure a partial region in a subframe as an empty space by using such a characteristic of a mini-slot.

According to an embodiment of the present disclosure, a section for transmitting a CSI-RS for beam management is set as an empty space by using mini-slots as shown in FIG. 8. In this configuration, it is possible to see that PDSCH Tx is performed through a data region in a subframe like related art. As a method of configuring such the empty mini-slots, the above-described three methods of embodiment 1 are reusable.

1. Define additional field in DCI transferring PDCCH scheduling information

2. Set Tx configuration information of empty PDSCH through RRC

3. Set Tx configuration information of empty PDSCH through RRC and use field in DCI as actual trigger Embodiment 3. Allocate Different CSI-RS Resources to Times/Frequencies which do not Overlap Each Other in Slot or Subframe to Transmit Multiple Tx Beams Basic beam management for repeatedly generating consecutive sections in a single symbol has been described in embodiment 1 and embodiment 2. In this case, a Tx beam of a gNB or a TRP is uniformly and repeatedly transmitted, and thus $N_{TX}$ subframes are required to sweep all of $N_{TX}$ beams. Here, a method of transmitting a plurality of Tx beams in a single subframe will be described.

Figure 9:
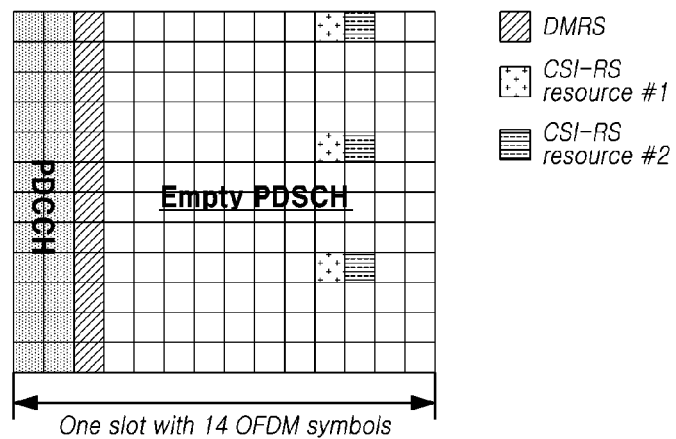
FIG. 9 is a diagram for showing configuring a multi-symbol CSI-RS by using multiple CSI-RS resources.

FIG. 9 is a diagram for showing configuring a multi-symbol CSI-RS by using multiple CSI-RS resources.

Since a CSI-RS pattern reuses an existing pattern defined for CSI acquisition by default, a basic pattern, a density, etc. are retained. Therefore, to additionally assign a CSI-RS, multiple CSI-RS resources for beam management may be allocated to a specific section.

For example, since an existing CSI-RS pattern, density, etc. are retained according to CSI-RS resources, the reuse principle of an existing CSI-RS pattern is not violated. Accordingly, a gNB may support Tx of a plurality of Tx beams by allocating several CSI-RS resources to a multi-symbol section or a single symbol.

Figure 10:
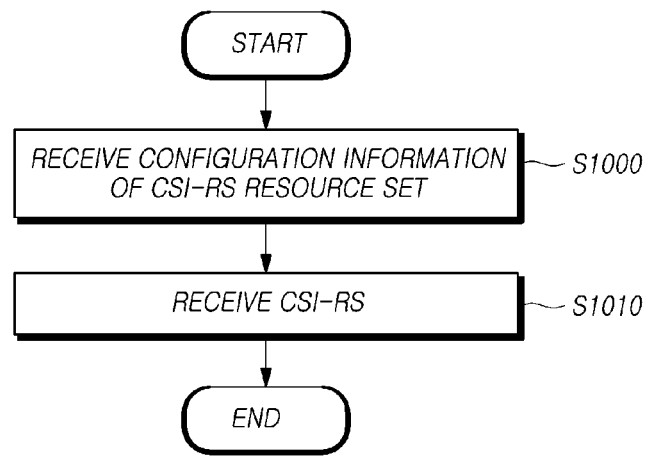
FIG. 10 is a flowchart illustrating a procedure of a UE receiving a CSI-RS according to an embodiment of the present disclosure.

FIG. 10 is a flowchart illustrating a procedure of a UE for receiving a CSI-RS according to an embodiment of the present disclosure.

Referring to FIG. 10, a UE may receive configuration information of a CSI-RS resource set including one or more CSI-RS resources from a BS (S1000).

Here, the respective CSI-RS resources in the CSI-RS resource set may have different symbols. That is, one CSI-RS resource included in the CSI-RS resource set may have a symbol different from the others included in the CSI-RS. In other words, symbols assigned to respective CSI-RS resources, which are time section resources for each CSI-RS, may be time-division multiplexed without overlapping each other.

As described above, when the respective CSI-RS resources are composed of different symbols, one symbol may be assigned to each CSI-RS resource. In other words, the CSI-RS resources may be allocated to time section resources having various symbol lengths, but each of the CSI-RS resources may be composed of a single symbol.

The symbols of the respective CSI-RS resources may be adjacent to each other or spaced apart from each other. In other words, it is unnecessary for all the CSI-RS resources to be adjacent to each other, and the CSI-RS resources may be spaced apart from each other by a fixed symbol distance or a variable symbol distance.

The configuration information of a CSI-RS resource set may include indication information indicating beam configurations for respective CSI-RS resources included in the CSI-RS resource set. In other words, a Tx beam for each CSI-RS resource included in the CSI-RS resource set may be configured on the basis of the configuration information of the CSI-RS resource set.

Such configuration information may be transmitted to the UE through higher layer signaling (e.g., RRC signaling).

For example, the indication information indicating the beam configurations for the respective CSI-RS resources included in the CSI-RS resource set may indicate that all the CSI-RS resources included in the CSI-RS resource set are transmitted through fixed Tx beams (e.g., Tx beams having the same Tx period and antenna port number). In this case, it is possible to assume that all the CSI-RS resources are set for fixed Tx beams and transmitted from the BS to the UE, and the UE may assume that all characteristics of the Tx beams for the respective CSI-RS resources are fixed.

For another example, the indication information indicating the beam configurations for the respective CSI-RS resources included in the CSI-RS resource set may indicate that Tx beams for transmitting the respective CSI-RS resources included in the CSI-RS resource set may have different characteristics. When the UE receives such indication information, the UE is required to consider that Tx beams for the CSI-RS resources may have different characteristics.

Then, the UE may receive a CSI-RS from the BS through the CSI-RS resources included in the CSI-RS resource set (S1010).

Figure 11:
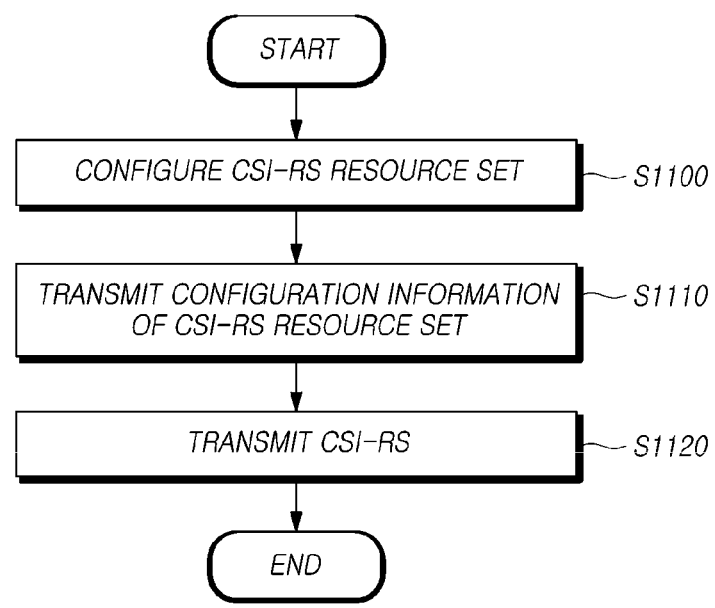
FIG. 11 is a flowchart illustrating a procedure of a BS transmitting a CSI-RS according to an embodiment of the present disclosure.

FIG. 11 is a flowchart illustrating a procedure of a BS for transmitting a CSI-RS according to an embodiment of the present disclosure.

Referring to FIG. 11, a BS may configure a CSI-RS resource set with one or more CSI-RS resources (S1100).

Here, the respective CSI-RS resources of the CSI-RS resource set may be composed of different symbols. That is, one CSI-RS resource included in the CSI-RS resource set may have a symbol different from the others included in the CSI-RS. In other words, symbols assigned to respective CSI-RS resources, which are time section resources for each CSI-RS, may be time-division multiplexed without overlapping each other.

As described above, when the respective CSI-RS resources are composed of different symbols, one symbol may be assigned to each CSI-RS resource. In other words, the CSI-RS resources may be allocated to time section resources having various symbol lengths, but each of them may be composed of a single symbol.

The symbols of the respective CSI-RS resource may be adjacent to each other or spaced apart from each other. In other words, it is unnecessary for all the CSI-RS resources to be adjacent to each other, and the CSI-RS resources may be spaced apart from each other by a fixed symbol distance or a variable symbol distance.

The BS may transmit configuration information of the CSI-RS resource set to a UE (S1110). Here, the configuration information of the CSI-RS resource set may include indication information indicating beam configurations for the respective CSI-RS resources included in the CSI-RS resource set. In other words, a Tx beam for each CSI-RS resource included in the CSI-RS resource set may be configured on the basis of the configuration information of the CSI-RS resource set.

Such configuration information may be transmitted to the UE through higher layer signaling (e.g., RRC signaling).

For example, the configuration information of the CSI-RS resource set may indicate that all the CSI-RS resources included in the CSI-RS resource set are transmitted through fixed Tx beams (e.g., Tx beams having the same Tx period and antenna port number). In this case, it is possible to assume that all the CSI-RS resources are set for fixed Tx beams and transmitted from the BS to the UE, and the UE may assume that all characteristics of the Tx beams for the respective CSI-RS resources are fixed.

For another example, the indication information indicating the beam configurations for the respective CSI-RS resources included in the CSI-RS resource set may indicate that Tx beams for transmitting the CSI-RS resources included in the CSI-RS resource set may have different characteristics. When the UE receives such indication information, the UE is required to consider that Tx beams for the CSI-RS resources may have different characteristics.

Also, the BS may transmit a CSI-RS to the UE through the CSI-RS resources included in the CSI-RS resource set (S1120).

Figure 12:
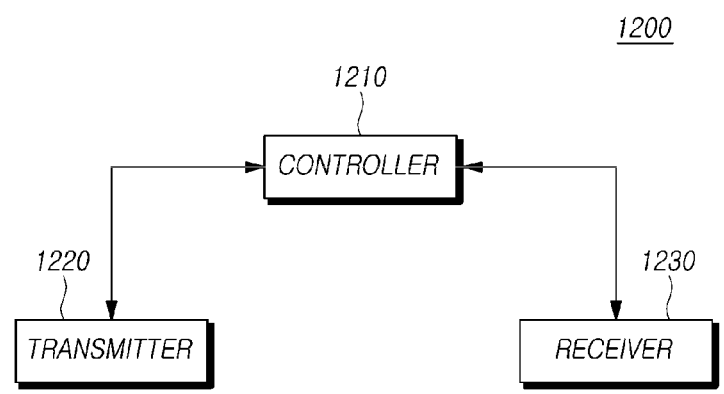
FIG. 12 shows a configuration of a BS according to an embodiment of the present disclosure.

FIG. 12 is a diagram showing a BS according to an embodiment of the present disclosure.

Referring to FIG. 12, a BS 1200 includes a controller 1210, a transmitter 1220, and a receiver 1230.

The controller 1210 may configure a CSI-RS resource set with one or more CSI-RS resources.

Here, the respective CSI-RS resources of the CSI-RS resource set may be composed of different symbols. That is, one CSI-RS resource included in the CSI-RS resource set may have a symbol different from the others included in the CSI-RS. In other words, symbols assigned to respective CSI-RS resources, which are time section resources for each CSI-RS, may be time-division multiplexed without overlapping each other.

As described above, when the respective CSI-RS resources are composed of different symbols, one symbol may be assigned to each CSI-RS resource. In other words, the CSI-RS resources may be allocated to time section resources having various symbol lengths, but each of them may be composed of a single symbol.

The symbols of the respective CSI-RS resource may be adjacent to each other or spaced apart from each other. In other words, it is unnecessary for all the CSI-RS resources to be adjacent to each other, and the CSI-RS resources may be spaced apart from each other by a fixed symbol distance or a variable symbol distance.

The transmitter 1220 and the receiver 1230 are used to transmit and receive signals, messages, and data, which are required to perform the above-described embodiment of the present disclosure, to and from a UE.

Specifically, the transmitter 1220 may transmit configuration information of the CSI-RS resource set to the UE and transmit a CSI-RS to the UE by using the CSI-RS resources included in the CSI-RS resource set.

Here, the configuration information of the CSI-RS resource set may include indication information indicating beam configurations for the respective CSI-RS resources included in the CSI-RS resource set. In other words, a Tx beam for each CSI-RS resource included in the CSI-RS resource set may be configured on the basis of the configuration information of the CSI-RS resource set.

Such configuration information may be transmitted to the UE through higher layer signaling (e.g., RRC signaling).

As an example, the configuration information of the CSI-RS resource set may indicate that all the CSI-RS resources included in the CSI-RS resource set are transmitted through fixed Tx beams (e.g., Tx beams having the same Tx period and antenna port number). In this case, it is possible to assume that all the CSI-RS resources are set for fixed Tx beams and transmitted from the BS to the UE, and the UE may assume that all characteristics of the Tx beams for the respective CSI-RS resources are fixed.

On the other hand, as another example, the indication information indicating the beam configurations for the respective CSI-RS resources included in the CSI-RS resource set may indicate that Tx beams for transmitting the CSI-RS resources included in the CSI-RS resource set may have different characteristics. When the UE receives such indication information, the UE is required to consider that Tx beams for the CSI-RS resources may have different characteristics.

Figure 13:
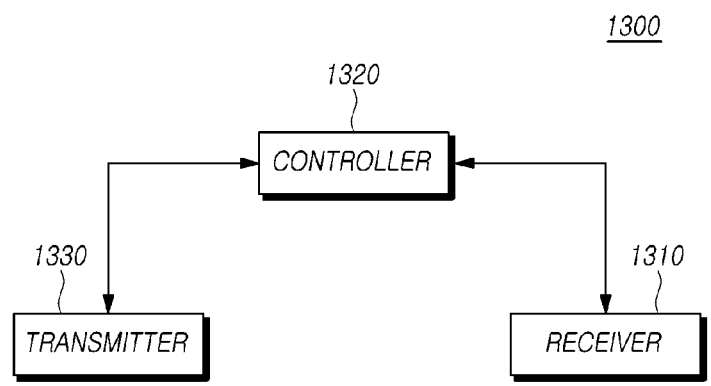
FIG. 13 shows a configuration of a UE according to an embodiment of the present disclosure.

FIG. 13 is a diagram showing a UE according to an embodiment of the present disclosure.

Referring to FIG. 13, a UE 1300 includes a receiver 1310, a controller 1320, and a transmitter 1330.

The receiver 1310 may receive configuration information of a CSI-RS resource set composed of one or more CSI-RS resources and receive a CSI-RS from a BS through the CSI-RS resources included in the CSI-RS resource set.

Here, the respective CSI-RS resources of the CSI-RS resource set may be composed of different symbols. That is, one CSI-RS resource included in the CSI-RS resource set may have a symbol different from the others included in the CSI-RS. In other words, symbols assigned to respective CSI-RS resources, which are time section resources for each CSI-RS, may be time-division multiplexed without overlapping each other.

As described above, when the respective CSI-RS resources are composed of different symbols, one symbol may be assigned to each CSI-RS resource. In other words, the CSI-RS resources may be allocated to time section resources having various symbol lengths, but each of them may be composed of a single symbol.

The symbols of the respective CSI-RS resource may be adjacent to each other or spaced apart from each other. In other words, it is unnecessary for all the CSI-RS resources to be adjacent to each other, and the CSI-RS resources may be spaced apart from each other by a fixed symbol distance or a variable symbol distance.

The configuration information of the CSI-RS resource set may include indication information indicating beam configurations for the respective CSI-RS resources included in the CSI-RS resource set. In other words, a Tx beam for each CSI-RS resource included in the CSI-RS resource set may be configured on the basis of the configuration information of the CSI-RS resource set.

Such configuration information may be transmitted to the UE through higher layer signaling (e.g., RRC signaling).

For example, the indication information indicating beam configurations for the respective CSI-RS resources included in the CSI-RS resource set are transmitted through fixed Tx beams (e.g., Tx beams having the same Tx period and antenna port number). In this case, it is possible to assume that all the CSI-RS resources are set for fixed Tx beams and transmitted from the BS to the UE, and the UE may assume that all characteristics of the Tx beams for the respective CSI-RS resources are fixed.

For another example, the indication information indicating the beam configurations for the respective CSI-RS resources included in the CSI-RS resource set may indicate that Tx beams for transmitting the CSI-RS resources included in the CSI-RS resource set may have different characteristics. When the UE receives such indication information, the UE is required to consider that Tx beams for the CSI-RS resources may have different characteristics.

According to the embodiments of the present disclosure, it is possible to provide a method of configuring CSI-RS resources for transmitting multiple Tx beams by using a CSI-RS configuration method by default which is defined by default in an NR in relation to beam management.

The standard content or standard documents mentioned in the above-described embodiments are omitted to simplify the description of this specification, but form a part of this specification. Therefore, adding a part of the standard content and standard documents to this specification or describing a part of the standard content and standard documents in the claims should be interpreted to being to the scope of the present disclosure.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method for a user equipment (UE) to receive a channel state indicator (CSI)-reference signal (RS) from a base station (BS), the method comprising:
   receiving configuration information of a CSI-RS resource set including one or more CSI-RS resources; and
   receiving a CSI-RS from the BS through CSI-RS resources included in the CSI-RS resource set,
   wherein the configuration information of the CSI-RS resource set includes indication information that indicates beam configurations for the respective CSI-RS resources included in the CSI-RS resource set,
   wherein one of the CSI-RS resources in the CSI-RS resource set is composed of a symbol different from that of the others in the CSI-RS resource set, and
   wherein each of the CSI-RS resources is composed of one symbol.

2. The method of claim 1, wherein the respective CSI-RS resources are configured based on the configuration information, and all the CSI-RS resources are set for fixed transmission (Tx) beams.

3. The method of claim 1, wherein the respective CSI-RS resources are configured based on the configuration information and set for different transmission (Tx) beams.

4. The method of claim 1, wherein the configuration information is received from the BS through higher layer signaling.

5. A method for a base station (BS) to transmit a channel state indicator (CSI)-reference signal (RS) to a user equipment (UE), the method comprising:
 configuring a CSI-RS resource set with one or more CSI-RS resources;
 transmitting configuration information of the CSI-RS resource set to the UE; and
 transmitting a CSI-RS to the UE by using CSI-RS resources included in the CSI-RS resource set,
 wherein the configuration information of the CSI-RS resource set includes indication information indicating beam configurations for the respective CSI-RS resources included in the CSI-RS resource set,
 wherein one of the CSI-RS resources of the CSI-RS resource set is composed of a symbol different from that of the others in the CSI-RS resource set, and
 wherein each of the CSI-RS resources is composed of one symbol.

6. The method of claim 5, wherein the respective CSI-RS resources are configured based on the configuration information, and all the CSI-RS resources are set for fixed transmission (Tx) beams.

7. The method of claim 5, wherein the respective CSI-RS resources are configured based on the configuration information and set for different transmission (Tx) beams.

8. The method of claim 5, wherein the configuration information is transmitted to the UE through higher layer signaling.

9. A user equipment (UE) for receiving a channel state indicator (CSI)-reference signal (RS) from a base station (BS), the UE comprising:
 a receiver configured to receive configuration information of a CSI-RS resource set including one or more CSI-RS resources and receive a CSI-RS from the BS through CSI-RS resources included in the CSI-RS resource set,
 wherein the configuration information of the CSI-RS resource set includes indication information indicating beam configurations for the respective CSI-RS resources included in the CSI-RS resource set,
 wherein one of the CSI-RS resources in the CSI-RS resource set is composed of a symbol different from that of the others in the CSI-RS resource set, and
 wherein each of the CSI-RS resources is composed of one symbol.

10. The UE of claim 9, wherein the respective CSI-RS resources are configured based on the configuration information, and all the CSI-RS resources are set for fixed transmission (Tx) beams.

11. The UE of claim 9, wherein the respective CSI-RS resources are configured based on the configuration information and set for different transmission (Tx) beams.

12. The UE of claim 9, wherein the configuration information is received from the BS through higher layer signaling.

* * * * *